US011273380B1

(12) United States Patent
Feeney et al.

(10) Patent No.: US 11,273,380 B1
(45) Date of Patent: Mar. 15, 2022

(54) METHOD AND APPARATUS FOR PREVENTING CHEATING IN A VIDEO GAME ENVIRONMENT BY PROVIDING OBFUSCATED GAME VARIABLES

(71) Applicant: Take-Two Interactive Software, Inc., New York, NY (US)

(72) Inventors: Kevin Feeney, New York, NY (US); Amir Soofi, New York, NY (US); Martin Hedlund, New York, NY (US)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 11 days.

(21) Appl. No.: 16/664,636

(22) Filed: Oct. 25, 2019

(51) Int. Cl.
*A63F 9/24* (2006.01)
*A63F 13/75* (2014.01)

(52) U.S. Cl.
CPC .................................. *A63F 13/75* (2014.09)

(58) Field of Classification Search
CPC .............................. A63F 13/75; G06F 21/79
See application file for complete search history.

(56) References Cited

U.S. PATENT DOCUMENTS

| | | | |
|---|---|---|---|
| 2008/0182659 A1* | 7/2008 | Sabella | A63F 13/10 463/29 |
| 2010/0162405 A1* | 6/2010 | Cook | H04L 63/1416 726/26 |
| 2016/0364583 A1* | 12/2016 | Benoit | H04L 9/3278 |
| 2017/0316218 A1* | 11/2017 | Hwang | H04L 9/302 |

OTHER PUBLICATIONS

Complete CheatEngine Tutorial(with pictures) Update Jan. 2015. Forum.cheatengine.org. Online. Jan. 2015. Accessed via the Internet. Accessed Mar. 26, 2021. <URL: https://forum.cheatengine.org/viewtopic.php?t=542093> (Year: 2015).*
How to Find Encrypted or Obfuscated Variables in Cheat Engine Guide. Guidedhacking.com . Online. Nov. 2, 2018. ccessed via the Internet. Accessed Mar. 26, 2021. <URL:https://guidedhacking.com/threads/how-to-find-encrypted-or-obfuscated-variables-in-cheat-engine-guide.11445/> (Year: 2018).*

* cited by examiner

*Primary Examiner* — Thomas J Hong
*Assistant Examiner* — Carl V Larsen
(74) *Attorney, Agent, or Firm* — Orrick, Herrington & Sutcliffe LLP

(57) ABSTRACT

A system and method for preventing cheating in a video game environment by obfuscating game variables in memory.

6 Claims, 3 Drawing Sheets

METHOD AND APPARATUS FOR PREVENTING CHEATING IN A VIDEO GAME ENVIRONMENT BY PROVIDING OBFUSCATED GAME VARIABLES

FIELD

The present disclosure relates generally to security provisions for computer software and more particularly to mechanisms to provide secure programming elements in video games, including methods and systems to prevent users from manipulating the memory of the program.

BACKGROUND

Cheating in video games is an ongoing problem in the game development industry. Unscrupulous players can cheat in several ways, ranging from technical hacks of the game to engaging in poor sportsmanship. For example, on the technical side, a player might use memory-editing software to teleport a character around the game map, change player attributes (e.g., health), or spawn powerful items to gain an unfair advantage in the game. Video game players may seek to manipulate (or otherwise hack) the software and/or data of the game in order to (a) acquire unauthorized in-game content, (b) create/maintain an unfair advantage in relation to the other players, and (c) circumvent security mechanisms placed in the game. For example, a player looking to gain one of these advantages may monitor the games' memory during game play to identify where in memory certain useful program (e.g., crown jewel) variables are stored. Examples of these useful program variables include the player's health, ammunition count, in-game-currency, etc. If the locations of these variables are found in memory, their values can be illegitimately changed using direct memory manipulation techniques. This would, for example, (a) enable a player to teleport to anywhere in the game world, by modifying the value of their coordinates, (b) enable a player to make themselves invulnerable by continuously setting their health value to the maximum every microsecond, (c) enable a player to modify the value of a damage multiplier to give them an unfair advantage against other players, and more similar attacks that disrupt an otherwise honest gaming experience, and (d) execute functionality not typical in normal gameplay (e.g., calling game code or scripts designed to support developer troubleshooting or debugging).

In an attempt to prevent players from easily identifying the location or value of these important game variables and constants, developers of conventional games create systems to encrypt, encode, and/or obfuscate those values or their respective locations. Additionally, these conventional systems may implement integrity checks on the data or maintain copies (encrypted, obfuscated, or in-the-clear) for consistency checking and detection if one of them is illegitimately modified.

These systems, however, have many disadvantages. For example, (a) they are difficult for programmers to implement, as they must be applied in every part of the game code that reads or writes to these sensitive values, (b) they must fit within the exceedingly high performance expectations so as to not impact the otherwise fast-paced environment modern gaming has set the standard for, (c) their functionality must withstand changes made by the operating-system that can seem illegitimate, even though perfectly normal, and (d) they can be easily identified in the game's memory at run-time, allowing attackers to find them and determine how to circumvent them.

Accordingly, there is a need for systems and methods for detecting and preventing cheating in online games in an effort to overcome the aforementioned obstacles and deficiencies of conventional video game systems.

Figure 1A:
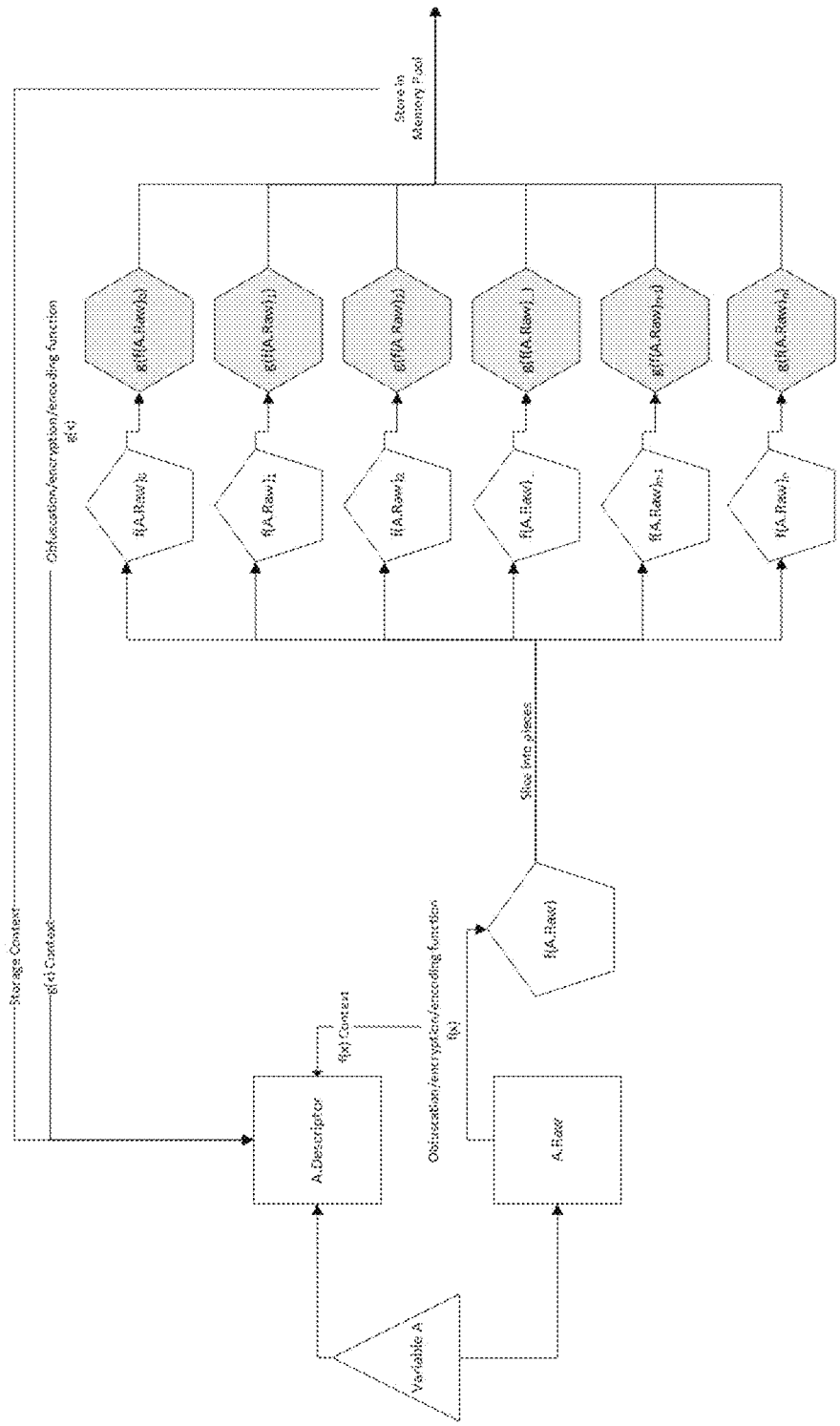
FIGS. 1A-C illustrate an exemplary data flow diagram illustrating one embodiment of a process for data obfuscation.

It should be noted that the figures are not drawn to scale and that elements of similar structures or functions are generally represented by like reference numerals for illustrative purposes throughout the FIGURES. It also should be noted that the figures are only intended to facilitate the description of the preferred embodiments. The FIGURES do not illustrate every aspect of the described embodiments and do not limit the scope of the present disclosure.

DETAILED DESCRIPTION OF PREFERRED EMBODIMENTS

As previously discussed, a player looking to gain additional advantages may monitor the games' memory during game play to identify where in memory certain useful program (e.g., crown-jewel) variables are stored. The present disclosure addresses these deficiencies by providing a system for code obfuscation and corresponding simplified programming tools for implementing accessing this functionality. In order to avoid exploits that attempt to monitor the software's memory file, the memory locations of protected variables are moved at regular but non-deterministic intervals. For example, if a variable comprising the player's location is protected and stored at memory location A at time $T_1$, the system will move that variable to location B at time $T_2$. If this is done at appropriate time intervals (e.g., every frame or every 33 ms), a player monitoring the memory will have greater difficulty in determining which memory location corresponds to the variable of interest—in this example, their location variable.

This is done by providing new managed data types, e.g., secure integer, that are protected by the game system automatically. Any general developer does not need to understand how the data is protected, only that they should use the types defined by this system for storing and accessing sensitive game values. The system then handles all memory management for the programmer and provides some configurable parameters that allow the programmer to optimize the storage of data given how it is used (e.g., written infrequently, but read regularly vs. written frequently, but read infrequently).

Figure 1B:
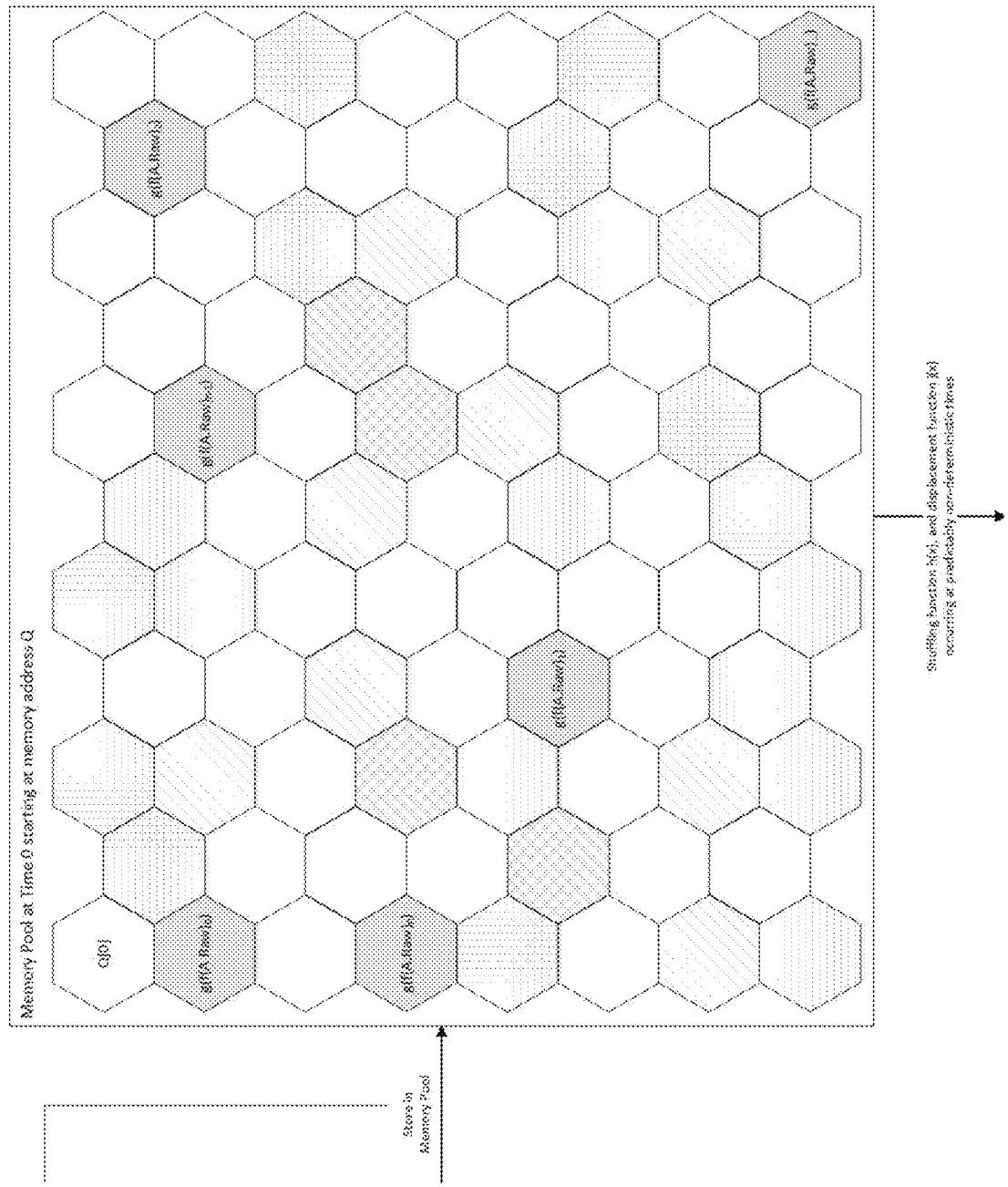
Figure 1C:
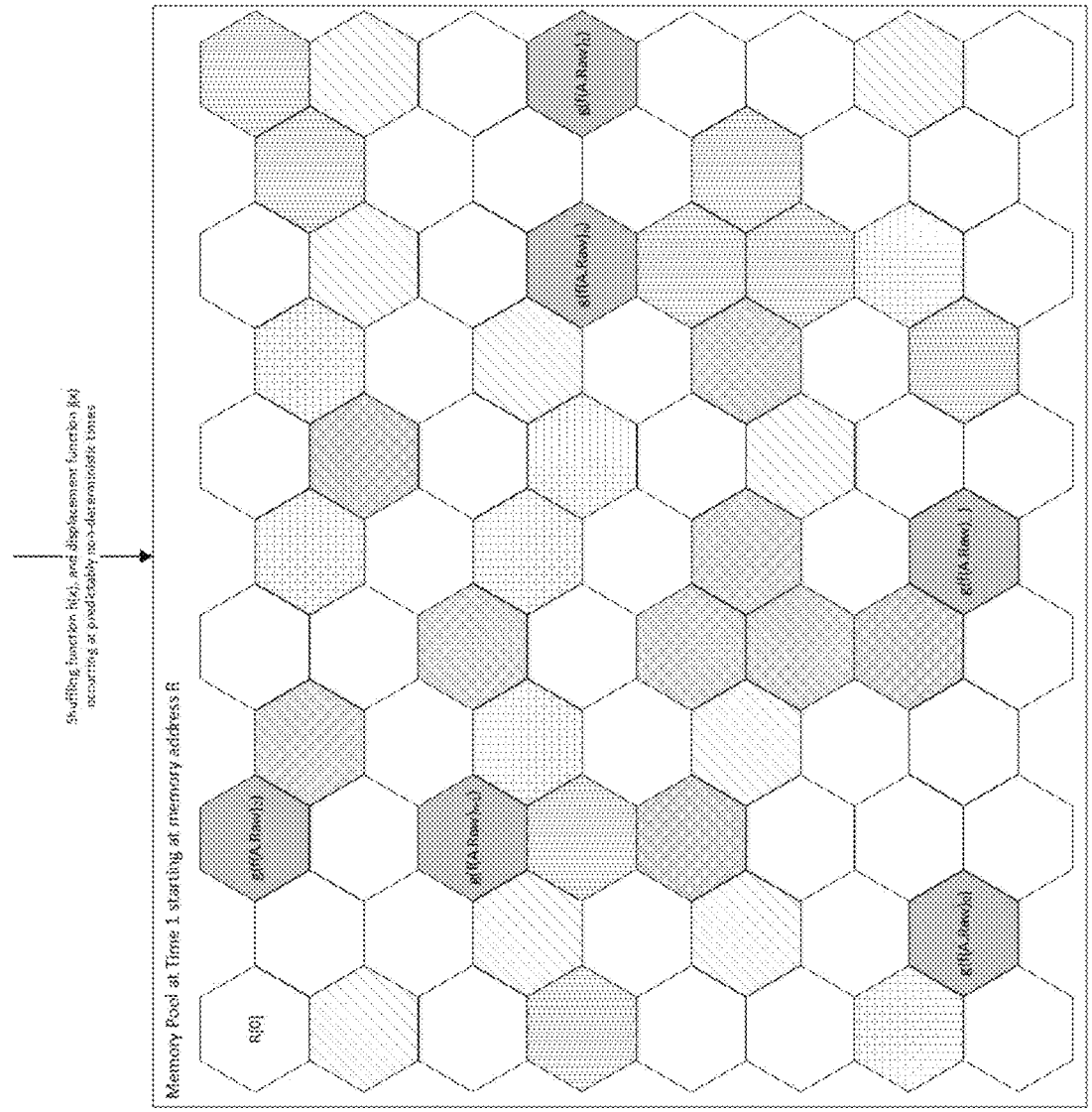

FIGS. 1A-C illustrate an exemplary data flow process for code obfuscation. The system maps these abstracted types onto pools of memory that optionally obfuscate the data, slice the data into small fragments and shuffle those fragments within the pool. Turning to FIG. 1A, when initialized, a variable is split into two components: a descriptor and a raw-chunk of memory. When referenced, the descriptor contains enough information to either store-into or load-from the 'true' value yielded from the transformed raw-chunk. A data-transformation and/or encryption is applied to the raw-chunk. This transformation uses a random number generated during the initialization of the variable, to make two variables with the same values look different. The raw-chunk is then sliced into numerous pieces depending on the size of the variable. Each piece is then optionally masked with either a constant number, or a random number generated during game play.

Turning to FIG. 1B, the pieces are then individually stored in a memory pool. When storing, the location of these individual pieces in that memory pool are optionally masked. For example, logical operations (e.g., OR, XOR, AND, and so on) or encryption schemes (e.g., AES256) can be used to mask the pieces. At this point, the variable is considered as 'in' the system and labelled 'protected.' The descriptor mentioned above stores all the associated metadata necessary, generated or not, to retrieve the correct data from each memory pool; it is the glue between the developer and this security system. In some embodiments, the stored descriptors can be protected by an integrity check, such as a checksum. With reference to FIG. 1C, at predictably non-deterministic times, the following occur: (a) memory pools are moved in memory, (b) the individual pieces from raw-chunks are shuffled within the pool of memory, and (c) the individual pieces from raw-chunks are re-transformed, with different masks than previously used.

All of this complex computation is made transparent to the general developer. In some embodiments, this is done by encapsulating the basic-types in programming with custom wrappers by using C++'s template framework. An unprotected integer can be declared as follows:

int x=42;

This embodiment requires that the general developer only add a templated keyword around the type of variable of their choice. A protected integer would be declared as follows:

Secure<int>x=42;

When protected, all references to the variable x utilize the complex logic described above. In creating a base-layer framework that can be consumed by a general developer with an easy interface that developers are familiar with, the management of the applied obscurity and obfuscation is handled for them. In some circumstances, additional code is referenced to translate the secured value from its obfuscated form into its 'true' value. For example, if x=42 represents the amount of gold bars a player has, earning additional gold bars (i.e., x+=1) results in the value being temporarily transformed back to its true form in order to perform the operation before transmitting it back into its obfuscated form.

A further advantageous aspect of the current system is the creation of corresponding new data types that allow the programmers to use the obfuscated variables. As one example, a new data type named PlayerLocation can be created by an arbitrary developer and can then be made protected by wrapping it with the Secure< >keyword, as exemplified above.

As a result, developers do have to be mindful for the associated performance penalties in using this protection system. The process of obfuscating data values as a part of a write operation and likewise de-obfuscating data values as a part of a read operation naturally takes longer than more direct memory operations since additional CPU cycles are needed to transform the data between protected and usable forms. Specifically, the storing-to and loading-from variables becomes more complex the larger the variable is, as a result of it being broken into many more individual pieces. Additionally, there may be a performance cost when considering a situation whereby the game is attempting to read or write to a protected game variable while the system is in the process of shuffling the data. Such time sensitive operations have been factored into the design as to minimize the number of CPU cycles that the developer will need to wait in order for data to be available.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A computer-based method for data obfuscation of a compiled executable computer program, said method comprising:

splitting a variable of the compiled executable computer program into a descriptor and a raw-chunk of memory by encapsulating the raw-chunk of memory with custom programming wrappers, wherein a true value yielded from the raw-chunk of memory can be derived from the descriptor;

transforming the raw-chunk of memory;

slicing the raw-chunk of memory into a predetermined number of slices based on a size of the game variable;

masking each slice with at least one of a constant number or a randomly generated number; and storing the masked slices into a memory pool.

2. The method of claim 1, further comprising moving the memory pools in memory.

3. The method of claim 1, further comprising shuffling the stored masked slices within the memory pool.

4. The method of claim 1, further comprising re-transforming the raw-chunks of memory with a mask that is different than the constant number or the randomly generated number.

5. The method of claim 1, wherein said transforming includes encrypting the raw-chunk of memory.

6. The method of claim 1, further comprising initializing the game variable, and wherein said transforming is based on a random number generated during the initialization of the game variable.

* * * * *